April 21, 1964 M. A. STILTNER 3,129,806
PRESTRESSED CONVEYOR BELTING
Filed Nov. 16, 1959 2 Sheets-Sheet 1
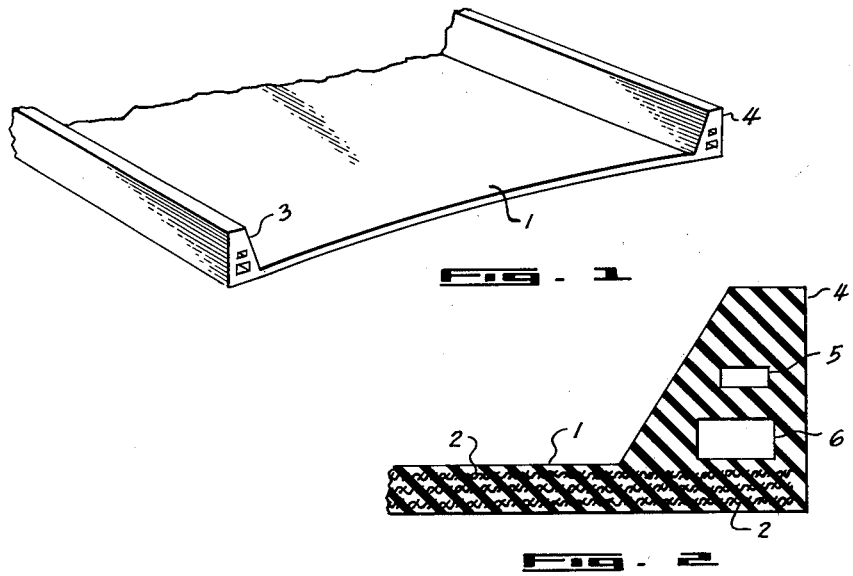
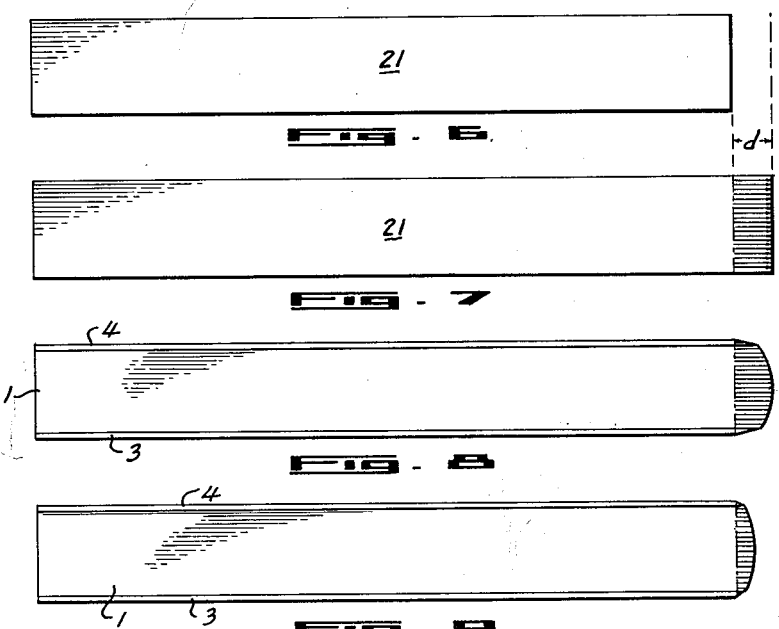
INVENTOR:
Marshall A. Stiltner
BY
ATTORNEYS

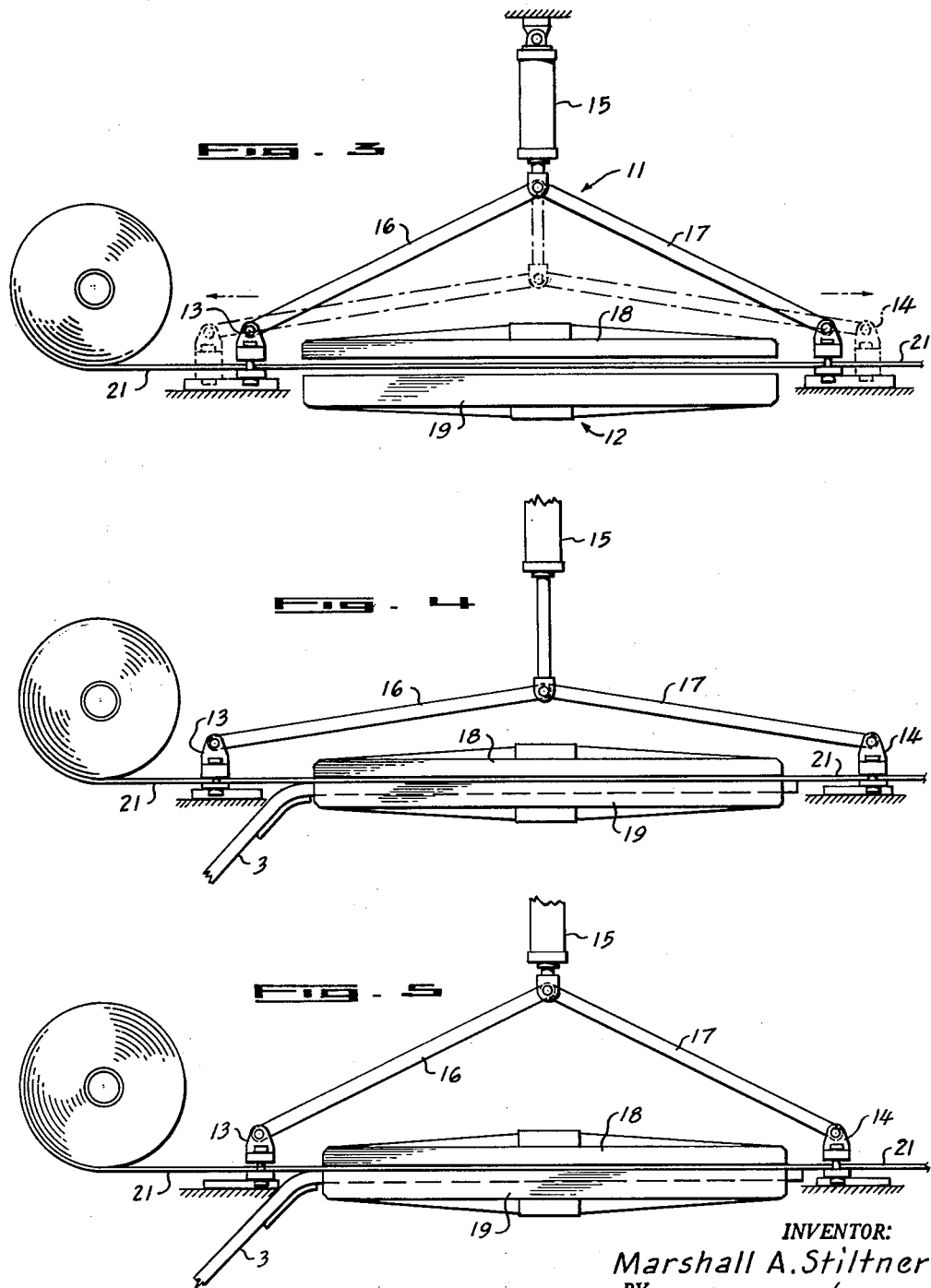

United States Patent Office 3,129,806
Patented Apr. 21, 1964

3,129,806
PRESTRESSED CONVEYOR BELTING
Marshall A. Stiltner, Piedmont, Calif., assignor, by mesne assignments, to The Monobelting Corp., Oakland, Calif., a corporation of California
Filed Nov. 16, 1959, Ser. No. 853,295
11 Claims. (Cl. 198—193)

This invention relates to and in general has for its object the provision of prestressed conveyor belting.

Although troughed belting has been used successfully for many years, it has many inherent faults which have been accepted or put up with merely because there has been a lack of anything better.

During the manufacture of flat rubber conveyor belting for troughing service, the belt fabric or carcass is prestretched to eliminate excessive stretching when the belting is placed in service. This stretch is applied just prior to closing the belting press for the final curing operation and results in a belt which is under uniform tension over its entire width prior to installation.

To make belts of this character track, the end pulleys on which they are installed are crowned. Normally this crown is in the order of 1/8" per foot of pulley width, but sometimes greater where extremely high tensions are encountered.

Since belting of this character, when installed over crowned end pulleys, has a uniform tension across its width, a secondary stress is set up in the belting along its center line when it is brought up to operating tension, which gradually diminishes outwardly along the decreasing diameter of the pulleys. This secondary stress greatly reduces the service life of the belting.

When designing a belt for troughing service, consideration must also be given to the transverse belt strength required to support the load between the troughing idlers. Usually this calls for an additional ply over the number of plies necsessary for maximum service tension. If this expedient is not resorted to, the belting will be subject to scuffing at the idlers, and to abrasion as the load shifts during transverse flexing.

Because of the secondary stress and transverse flexing above discussed, it is essential to take care to load the belt uniformly about its center line, for otherwise the load will shift. This can result from the fact that excessive nonconcentric loading will usually substantially equal the secondary stress along the center line of the belt and this will cause the belt to run off the pulleys at the heavily loaded side.

If the pulleys are lagged (and most of them are), the secondary stresses resulting from the use of crowned pulleys cause the pulley lagging to wear more at the points of the higher secondary stress than at other points on the pulley, and this results in premature lagging failure at the points of higher stress.

Due to the secondary stretch and tension that must take place in a belt in order for it to conform to the crown of the end pulleys, it is exceedingly difficult to train or "run in" a new belt over its pulleys. As a matter of fact, premature splice failures are frequent because of this difficulty, for it is considered expedient by some operators to artificially assist this stretch or "running in" by cocking or tilting the idlers. The stresses set up by this guiding method are usually extremely hard on splices and the belt in general. So much for the deficiencies of troughing belts and an analysis of the reasons thereof.

More specifically, one of the objects of this invention is the provision of conveyor belting for use over crowned end pulleys, said belting including: an elongated section of reinforcing fabric embedded in a body of cured elastomer, the body of elastomer serving to hold the fabric under tension lengthwise thereof, and said tension having a gradient crosswise of the belt substantially equal to or greater than the inclination or taper gradient of said pulleys whereby when a belt made from said belting is applied to said end pulleys and brought up to operating tension, the tension of said belting will be substantially uniform over its entire width.

Another object of this invention is the provision of conveyor belting of the character above described provided with upstanding side flanges formed with longitudinally extending holes or channels such as described in the Syce Patent No. 2,896,773 issued July 28, 1959.

Still another object of this invention is the provision of a method for making prestressed conveyor belting wherein an uncured length of fabric-reinforced belting carcass is stretched lengthwise with a transverse stretch gradient diminishing from the center line of said carcass to its edges and then the carcass as so stretched is cured, whereby the cured elastomer of the carcass serves to hold the fabric of the carcass under a longitudinal tension having a transverse gradient.

The invention possesses other advantageous features, some of which, with the foregoing, will be set forth at length in the following description where that form of the invention which has been selected for illustration in the drawings accompanying and forming a part of the present specification is outlined in full. It said drawings, one form of the invention is shown, but it is to be understood that it is not limited to such form, since the invention as set forth in the claims may be embodied in other forms.

Referring to the drawings:

FIG. 1 is an isometric view of a section of conveyor belting embodying the objects of my invention.

FIG. 2 is a fragmentary section of the belting illustrated in FIG. 1.

FIG. 3 is a schematic representation in side elevation of my belting in its first and second stages of manufacture wherein use is made of a conventional sheet stretcher and curing mold press, the second stage of manufacture being indicated in dash line.

FIG. 4 is a view similar to that illustrated in FIG. 3 but wherein the third stage in the manufacture is diagrammatically shown.

FIG. 5 is likewise a view similar to that illustrated in FIG. 3 but showing the fourth and final stage in the manufacture of said belting.

FIG. 6 is a diagrammatic illustration of a section of uncured and unstretched fabric-reinforced belting carcass.

FIG. 7 diagrammatically illustrates the stretch and tension condition of the carcass shown in FIG. 6 but after it has been stretched lengthwise uniformly across its width as a result of the first step of my process by a conventional sheet stretcher.

FIG. 8 diagrammatically illustrates the stretch and tension condition of the carcass illustrated in FIG. 7 after the belting flanges have been superimposed and clamped over the carcass edges by a conventional press mold and the stretcher clamps released.

FIG. 9 diagrammatically illustrates the final stretch and tension condition of the cured and bonded carcass and flange assembly.

As illustrated in FIGS. 1 and 2, the prestressed conveyor belting of my invention includes a slightly crowned sheet 1 of cured rubber or other elastomer in which are embedded several layers 2 of reinforcing fabric such as canvas duck and the lateral edges of which are bonded to upstanding flanges 3 and 4. The side flanges 3 and 4 are of truncated form in cross-section and each flange is provided with internal channels 5 and 6, rectangular in cross-section. As will presently appear, this entire structure is so vulcanized that the fabric reinforcing layers are held under tension by the body of the rubber sheet 1, the latter of course being under a complementary compression. The tension referred to exists lengthwise of the belt and is substantially uniform across its width. In effect such belting is prestretched, and has a stretch gradient extending longitudinally of the belting and uniformly diminishing from the center line thereof to its flanged edges in substantial conformity with the crown of the end rolls or pulleys over which a belt of such belting is designed to operate.

As successively illustrated in FIGS. 3–5, belting of this character can be conveniently made by the use of a conventional sheet stretcher generally designated by the reference numeral 11 and an intervening and conventional curing press mold generally designated by the reference numeral 12.

Included in the sheet stretcher 11 are end sheet stretcher clamps 13 and 14 and some means such as a hydraulic cylinder 15 and links 16 and 17 pivoted to the stem of the cylinder piston and the clamps 13 and 14 for expanding the clamps.

The press 12 includes upper and lower mold plates or plattens 18 and 19, one of which is formed with an internal cavity which in cross-section should be complementary to the configuration of the belting to be processed and of the same dimensions.

In the first stage of my process and as illustrated in full lines in FIG. 3, a length or section of uncured fabric-reinforced belting carcass 21 is threaded through the open stretcher clamp 13, drawn between the open plates 18 and 19 of the press 12 and threaded through the open stretcher clamp 14. The stretcher clamps 13 and 14 are then closed tightly on the belting carcass over the entire width thereof. At this stage of the process and as indicated in FIG. 6 the uncured carcass 21 is under neither tension nor compression. Here it is to be noted that the duck reinforcing 2 of the carcass has a considerable degree of elasticity and will retain such elasticity unless stretched beyond its elastic limit. However, the body of rubber or other elastomer in which the reinforcing duck is embedded, and which is referred to as the carcass, has no resiliency while in its uncured state, but acquires resiliency upon being cured.

In the next stage of my process the carcass is uniformly stretched longitudinally by depressing the inner ends of the links 16 and 17 all as indicated in dash line in FIG. 3. Here it is to be noted that the press plates 18 and 19 are maintained in their open position during this step of the process. As a result of this step the carcass, and more particularly its duck reinforcing fabric 2, is given a predetermined stretch $d$ as indicated in the shaded portion of FIG. 7, and this stretch and corresponding tension are uniformly disposed across the width of the sheet 21. Although the uncured rubber of the carcass is also stretched, it remains without tension.

Following this, and as the third step of the process as illustrated in FIG. 4, uncured rubber or elastomer side flanges 3 and 4 are threaded through the complementary mold cavities in the open press 12 so as to overlie or underlie the edges of the uncured stretched carcass.

To prevent the closed channels 5 and 6 of the flanges from collapsing during the succeeding steps of my process, metal bars or strips rectangular in cross-section should be threaded through the channels at this stage of the process and then removed after the processing of the belting has been completed.

Following this the press is closed and clamped on the uncured carcass and flange assembly. Here it should be particularly noted that although that portion of the carcass disposed between the flanges 3 and 4 can be just as tightly gripped by the mold press as by the stretcher clamps 13 and 14, it is impossible to clamp or hold as tightly the sides of the carcass and their overlying flanges. The additional thickness of the flanges over these areas accounts for this.

Now with the mold press so holding the carcass and as illustrated in FIG. 5, the stretcher clamps 13 and 14 are released so that only the press plates hold the carcass and flange assembly. However, since the reinforcing duck fabric is resilient and has been stretched a distance $d$ (less than its elastic limit), it will tend to contract to its neutral condition. Although the mold press prevents the central portion of the fabric from doing this, its sides or edges can contract to some extent, for as above stated the fabric edges overlying the side flanges cannot be as firmly gripped as is the central portion of the fabric. This condition of the stretch of the fabric is illustrated by the shaded portion of FIG. 8 and more particularly by the contour of the right-hand end of the carcass 21. At this stage of the process the carcass and flange assembly are still in an uncured and unbonded state. Probably a portion of the contracting movement of the fabric edges is imparted to the side flanges due to their intimate frictional engagement with the carcass. However, what here has happened to the flanges is immaterial.

Finally, with the stretch condition of the carcass and flange assembly as indicated in FIG. 8, the molding press 12 is brought up to its curing temperature so as to cure the entire belting assembly and bond the flanges to the carcass.

Since the curing process (conventional) renders the carcass and flanges elastic, upon the release of the press plates from the cured belting the fabric reinforcing, being under tension, will try to contract substantially to its original neutral condition. But this it can do only to a limited extent, for in doing so it must of necessity place the carcass and its flanges under compression. The condition of stretch when the system comes into balance is diagrammatically illustrated by the shaded portion of FIG. 9 and more particularly by the right-hand line delineating this portion and which approximates the crown of the end rolls over which a belt made of such belting is designed to operate.

Although for purposes of illustration it has been necessary to indicate the stretch imparted to the duck fabric as occurring entirely at one end of the belting, it is actually distributed uniformly throughout the length of the belting. This, then, results in a fullness or crown in the belting occurring along its center line and having a gradient across the belting represented by the shaded portion of FIG. 9.

When a belt made from belting of this character is reeved over crowned end pulleys, and brought up to operating tension, such tension will be uniform throughout the width of the belt. Otherwise expressed, the belt will grip the end pulleys uniformly throughout their length. As a result of this, any lateral creeping of the belt over either pulley is counteracted by the increase in the tension to which the belt would be subjected where it is trying to move laterally over the pulley crown. A belt of this character will therefore continue to track properly without the occurrence of secondary stresses even though it is not uniformly loaded across its width.

Furthermore, even though a belt of this character be subjected to a considerable load, it will not buckle downwardly, for the end pulleys impart to the belting a slight transverse upward crown, and in order to assume a reverse crown it would have to pass through a dead-center position of increased width. This, however, is restrained first by the longitudinal tension under which the belt is operating, and second by the fact that this would place the woof threads of the duck reinforcing under tension and the rubber of the carcass under compression. Any tensioning of the woof threads would be accompanied by a complementary tensioning of the warp threads, and this would place the carcass rubber and flanges under greater compression. In short, the whole system tends to restrain the belting from going through its dead-center position from a slight upward crown to a downward crown.

Furthermore, belting of this character requires no break-in period and can be used without troughing rolls. Here it should be noted that the side flanges of the belt operate to make troughing unneccessary.

Normally the crown of an end pulley is in the order of ⅛" per foot, and this is the order of the stretch and tension gradient imparted to the prestressed belting embodying my invention. It can therefore be seen that stretch and tension conditions of the belting have been greatly exaggerated, but merely for purposes of illustration.

I claim:

1. Fabric-reinforced elastomer conveyor belting prestressed and cured with a transverse crown, the fabric of said belting being held under tension by the elastomer of the belting, said tension having a transverse gradient diminishing from the center line of the belting to its edges.

2. Conveyor belting of the character set forth in claim 1 and designed for use over end pulleys having a predetermined crown wherein the tension gradient across said belting from each edge thereof to its center line is in proportion to the said predetermined crown.

3. Prestressed conveyor belting for use over crowned end pulleys having a predetermined inclination gradient: comprising an elongated section of reinforcing fabric embedded in a body of cured elastomer provided with upstanding side flanges wherein said elastomer holds said fabric under tension lengthwise of said belting and varying transversely thereof substantially in proportion to said inclination gradient.

4. Fabric-reinforced elastomer conveyor belting cured in a longitudinally prestretched condition wherein said prestretched condition has a transverse gradient diminishing laterally from the center line of the belting to its edges.

5. Prestressed conveyor belting of the character set forth in claim 3 wherein said belting is slightly crowned transversely thereof.

6. Fabric-reinforced elastomer belting wherein the fabric of said belting is held under tension longitudinally of said belting by the elastomer of the belting and wherein said tension has a gradient transversely of said belting diminishing from the center line of the belting to its edges.

7. Prestressed conveyor belting comprising at least one layer of reinforcing fabric embedded and bonded in a cured sheet of elastomer, said fabric being prestressed during its manufacture with a stretch lengthwise of said sheet and said stretch having a gradient transverse of said sheet diminishing from the center line of said belt to its edges.

8. The method of making prestressed conveyor belting comprising: stretching an uncured length of fabric-reinforced belting carcass lengthwise with a transverse stretch gradient diminishing from the center line of said carcass to its edges and then curing the carcass as so stretched whereby the fabric of the cured carcass will be held under tension by the elastomer of the carcass.

9. Conveyor belting of the character set forth in claim 7 provided with upstanding side flanges.

10. Conveyor belting comprising: fabric reinforcing embedded and bonded to and within an elastomer sheet wherein said fabric reinforcing is held under tension by said elastomer sheet, wherein said elastomer sheet is held under compression by said fabric reinforcing, and wherein said tension has a transverse gradient diminishing from the center line of the belting to its edges.

11. The method of claim 8 wherein stretching of said fabric-reinforced belting carcass is carried out by stretching the carcass to a point short of its yield point, overlaying a length of an upstanding flange of uncured elastomer along each edge of said carcass, then clamping said carcass and its flanges in a press mold while said carcass is stretched with a transverse stretch gradient diminishing from the center line of said carcass to its edges.

References Cited in the file of this patent

UNITED STATES PATENTS

| | | |
|---|---|---|
| 1,370,597 | Lambert | Mar. 8, 1921 |
| 2,526,324 | Bloomfield | Oct. 17, 1950 |
| 2,593,284 | Ewell | Apr. 15, 1952 |
| 2,896,773 | Syce | July 28, 1959 |